No. 697,883.  
Patented Apr. 15, 1902.

R. E. POINDEXTER.  
SAW TOOTH GAGE.  
(Application filed Oct. 8, 1901.)

(No Model.)

Witnesses  
H. S. Austin  
Martin Keeling

Inventor  
Robert E. Poindexter  
By E. W. Bradford  
Attorney

THE NORRIS PETERS CO., PHOTO-LITHO., WASHINGTON, D. C.

UNITED STATES PATENT OFFICE.

ROBERT E. POINDEXTER, OF INDIANAPOLIS, INDIANA.

SAW-TOOTH GAGE.

SPECIFICATION forming part of Letters Patent No. 697,883, dated April 15, 1902.

Application filed October 8, 1901. Serial No. 77,994. (No model.)

*To all whom it may concern:*

Be it known that I, ROBERT E. POINDEXTER, a citizen of the United States, residing at Indianapolis, in the county of Marion and State of Indiana, have invented certain new and useful Improvements in Saw-Tooth Gages, of which the following is a specification.

My said invention consists in certain improvements in the details of construction of combined saw jointers and gages of that general form shown in several patents heretofore granted to me—for example, Patent No. 377,328, of January 31, 1888—the present invention relating particularly to an improvement in the form of the gage-plate, whereby it is adapted not only to serve as a gage in filing off the points of the clearing or rake teeth to the proper length, but also as a gage in filing their beveled faces to the proper and a uniform pitch, all as will be hereinafter more particularly described and claimed.

Figure 1:
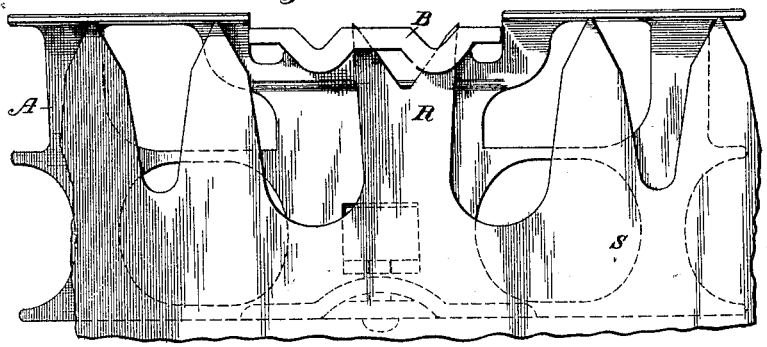
Figure 2:
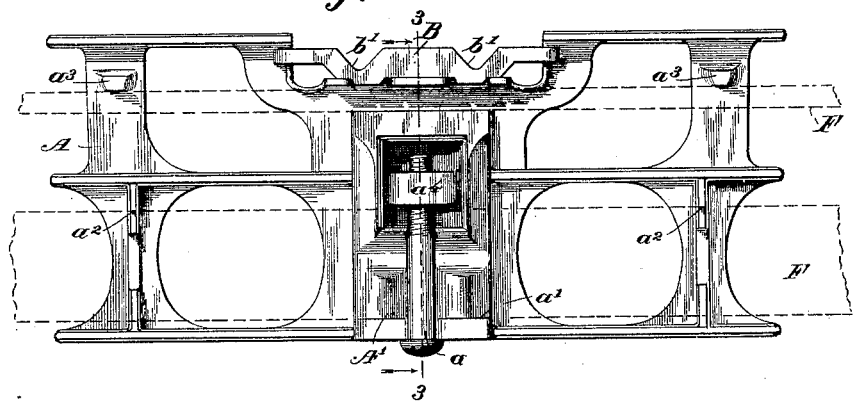
Figure 3:
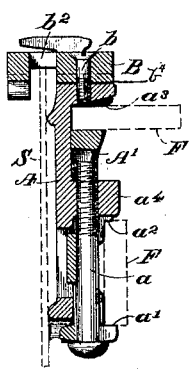

Referring to the accompanying drawings, which are made a part hereof, and on which similar letters of reference indicate similar parts, Figure 1 is an elevation of one side of a tool of the character mentioned, showing its position on a saw, as when it is to be used as a gage for shaping one of the rake-teeth; Fig. 2, an elevation of the reverse side of the tool, the two positions of the file, showing how said file is clamped therein for use in jointing either the points or sides of the teeth, being indicated by dotted lines; and Fig. 3, a cross-section on the dotted line 3 3 in Fig. 2 looking in the direction therefrom indicated by arrows.

In said drawings the portions marked A represent the frame or block of the tool, and B the gage-plate. Said block A is of substantially the form shown and described in the patent above mentioned, having a clamping-plate A', mounted to slide in a transverse way and adapted to be operated by a screw $a$, which engages said plate and a screw-threaded perforation in a lug $a^4$ on said block to clamp a file F in an edgewise position between a flange $a'$ on its outer end and shoulders $a^2$ in ribs formed on the block and in a flat position between its inner end and projections $a^3$ on said block, as is well understood.

The gage-plate B is mounted in a recess in one side of the block, the bottom of which is properly formed to support it and is secured in position by a screw $b$. Liners $b^4$ may be interposed between the plate and bottom of the recess to adjust its height properly. The top of said plate is formed with two transverse V-shaped grooves $b'$, one at each end of the longitudinal slot $b^2$, through which the rake-teeth extend when the tool is being used for gaging them.

In Fig. 1 is shown a fragment of a saw S with one of its rake-teeth R in position to be operated upon. The outside or straight side of the tooth rests against the end of slot $b^2$, showing the point projecting through said slot and slightly above the surface of the plate B, with a portion of its beveled side projecting beyond the bevel of the adjacent side of groove $b^2$.

In operation the filer files off the point of said tooth even with the top of the gage-plate and then files down the bevel even with the beveled side of the groove. The exact form of point desired is thus given to the tooth and all the teeth made of uniform shape. After the tool has been removed the filer can file down the remainder of the beveled sides of the tooth to conform to the bevel of the point. The points of the tooth are, however, shaped by the gage-plate and left as thus shaped, insuring not only uniform length of these teeth, but uniform pitch and form, with the advantages which are well known. In use the tool is placed on the saw as shown in Fig. 1, the point of the rake-tooth being brought against one end of slot $b^2$. The filer files down both the point and bevel to conform to the gage, then slides the tool to bring the other side of the tooth against the other end of slot $b^2$, and dresses the other point in the same way, each tooth being successively operated upon until the saw is complete. The teeth after being so formed at the points are then preferably beveled correspondingly for the entire length of the beveled sides.

Having thus fully described my said invention, what I claim as new, and desire to secure by Letters Patent, is—

1. The combination, in a saw-jointer and gage, of a gage-plate having a horizontal gaging-surface for the points of the teeth, and also a tapered gaging-surface for the sides of the teeth, substantially as set forth.

2. In a saw-jointer and gage, the combination, of the block and the gage-plate formed with a longitudinal slot through which the teeth project when being operated upon, and transverse grooves at each end of said slot formed with beveled sides to serve as a gage in forming the bevel of the teeth, substantially as set forth.

3. A gage-plate for forming the points of saw-teeth having a square top surface, and a transverse beveled surface, substantially as set forth.

4. A gage-plate for forming the points of saw-teeth having a separate form for both the points and sides thereof.

In witness whereof I have hereunto set my hand and seal, at Indianapolis, Indiana, this 30th day of September, A. D. 1901.

ROBERT E. POINDEXTER. [L. S.]

Witnesses:
H. E. SMOCK,
D. K. HALL.